(12) United States Patent  
Smalley, Jr.

(10) Patent No.: US 6,293,464 B1  
(45) Date of Patent: Sep. 25, 2001

(54) CARD READER

(76) Inventor: Jared Joseph Smalley, Jr., 1416 Blue Mountain Pkwy., Harrisburg, PA (US) 17112

( * ) Notice: Subject to any disclaimer, the term of this patent is extended or adjusted under 35 U.S.C. 154(b) by 0 days.

(21) Appl. No.: 09/225,767

(22) Filed: Jan. 5, 1999

(51) Int. Cl.$^7$ .................................................. G06K 7/08
(52) U.S. Cl. .................... 235/451; 235/435; 235/441; 235/479; 235/483; 235/486; 235/492; 361/736; 361/737; 439/567; 439/630; 439/954
(58) Field of Search ............................ 140/147; 439/569, 439/630, 567, 945; 235/483, 486, 492, 441, 479, 435, 451; 361/736, 737, 802, 807

(56) References Cited

U.S. PATENT DOCUMENTS

| | | | |
|---|---|---|---|
| 5,176,523 | | 1/1993 | Lai .................................. 439/64 |
| 5,231,274 | * | 7/1993 | Reynier et al. ...................... 235/441 |
| 5,320,552 | | 6/1994 | Reichardt et al. .................... 439/331 |
| 5,520,551 | * | 5/1996 | Broschard, III ...................... 439/567 |
| 5,703,346 | * | 12/1997 | Bricaud et al. ...................... 235/441 |
| 5,709,568 | | 1/1998 | Pan et al. ........................... 439/541.5 |
| 5,734,151 | | 3/1998 | Vandenengel ........................ 235/441 |
| 5,796,085 | * | 8/1998 | Bleier ................................ 235/441 |
| 5,877,488 | * | 3/1999 | Klatt et al. .......................... 235/486 |
| 5,955,722 | * | 9/1999 | Kurz et al. .......................... 235/486 |
| 5,969,330 | * | 10/1999 | Korsunsky et al. ................... 235/486 |
| 6,068,186 | * | 5/2000 | Jubet ................................. 235/441 |
| 6,097,605 | * | 8/2000 | Klatt et al. .......................... 361/737 |
| 6,129,572 | * | 10/2000 | Feldman et al. ..................... 439/328 |
| 6,134,114 | * | 10/2000 | Ungermann et al. ................. 235/486 |

FOREIGN PATENT DOCUMENTS

| | | |
|---|---|---|
| 0 605 204 A2 | 7/1994 | (EP) . |
| 0738983 A1 | 10/1996 | (EP) ............................. G06K/7/06 |
| 0919944 A2 | 6/1999 | (EP) . |

* cited by examiner

*Primary Examiner*—Michael G. Lee  
*Assistant Examiner*—Uen-Chau Le

(57) ABSTRACT

A card reader (10) includes a housing (12) having a top wall (14), opposed side walls (34), a closed end (30) and an open end (26) defining a card-receiving slot (40), and an array of terminals (50) secured in the housing. The card-receiving slot (40) is spaced upwardly a selected distance from a board-mounting face (22) of the housing (12). The top wall (14) includes an opening (18) therethrough in communication with the card-receiving slot (40) remote from the terminals (50), the opening (18) being aligned with a corresponding opening in the housing (12) beneath the card-receiving slot (40). Portions of a circuit board (70) beneath the housing are exposed for access from above the card reader (10) after mounting to the board (70), when a card (60) is not disposed in the card-receiving slot (40), thereby permitting low profile electronic components (76) to be mounted on the exposed portions of the board or tested or removed therefrom.

5 Claims, 3 Drawing Sheets

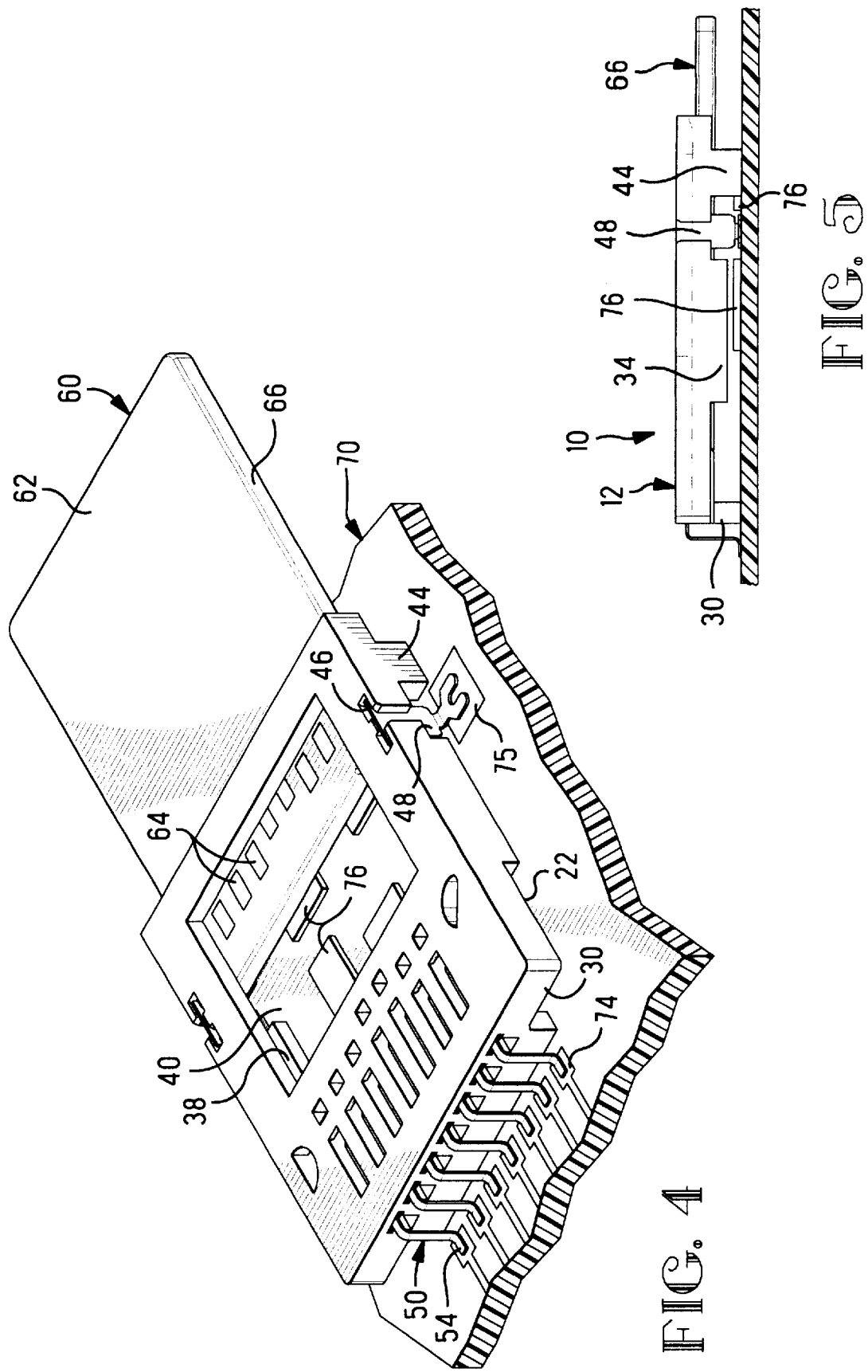

CARD READER

FIELD OF THE INVENTION

This invention is directed to card readers.

BACKGROUND OF THE INVENTION

Card readers mounted to circuit boards are used in many electronic devices to provide various capabilities. The size of the card reader depends upon the dimension of the card that contains the stored information. With the increased interested in miniaturizing electronic devices, such as for example, cellular Telephones, pagers, toys and the like, there is need to decreased the amount of space required for the circuit board. In addition to the board space required for the card reader, space is also required to mount various electronic components, such as resistors, capacitors and the like, that also occupy space on the board. It is desirable therefore to provide a card reader that helps to minimize the size of the circuit board used in the electronic apparatus.

SUMMARY OF THE INVENTION

The present invention is directed to a card reader that alleviates problems associated with the prior art. The card reader includes an insulated hosing, having a top wall, opposed side walls, a closed arid, and an open end defining a card-receiving slot and an array of terminals. The housing also defines a board-mountable face. The terminals have respective board connecting sections exposed along the board mounting face for connection to circuits of the circuit board and card-connecting sections exposed in the card receiving slot. The card receiving slot is spaced upwardly a selected distance from the board mounting face. The top wall includes an opening therethrough in communication with the card-receiving slot remote from the card-connecting sections and board-connecting sections of the terminals. The opening is aligned with a corresponding opening in the housing beneath the card-receiving slot whereby portions of the board beneath the housing are exposed for access from above the card reader after mounting to the board and when a card is no disposed in the card-receiving slot. Low profile electronic components can then be mounted on the exposed portion of the circuit board, tested or removed therefrom. Owing to the placement off the desired electronic components beneath the card reader, the circuit board required for the electronic device can be made substantially smaller.

The invention is further directed to a card reader comprising a housing including a top wall, card-receiving slot, and a board-mounting face, said card-receiving slot being spaced upwardly a selected distance from said board-mounting face; and said top wall including an opening therethrough in communication with said card-receiving slot, said opening being aligned with a corresponding opening in said housing beneath said card-receiving slot, whereby portions of a board beneath said housing are exposed for access from above said housing after mounting to said board, when a card is not disposed in said card-receiving slot, thereafter permitting low profile electronic components to be mounted on said exposed portions of said board tested or removed therefrom.

BRIEF DESCRIPTION OF THE DRAWINGS

An embodiment of the invention will now be described with reference to the accompanying drawings.

FIG. 4 is an isometric view similar to FIG. 1 with the card partially inserted into the reader and illustrating the position of the components mounted on the circuit board.

FIG. 5 is a side view of the card reader of FIG. 1.

DETAILED DESCRIPTION OF AN EMBODIMENT OF THE INVENTION

Figure 1:
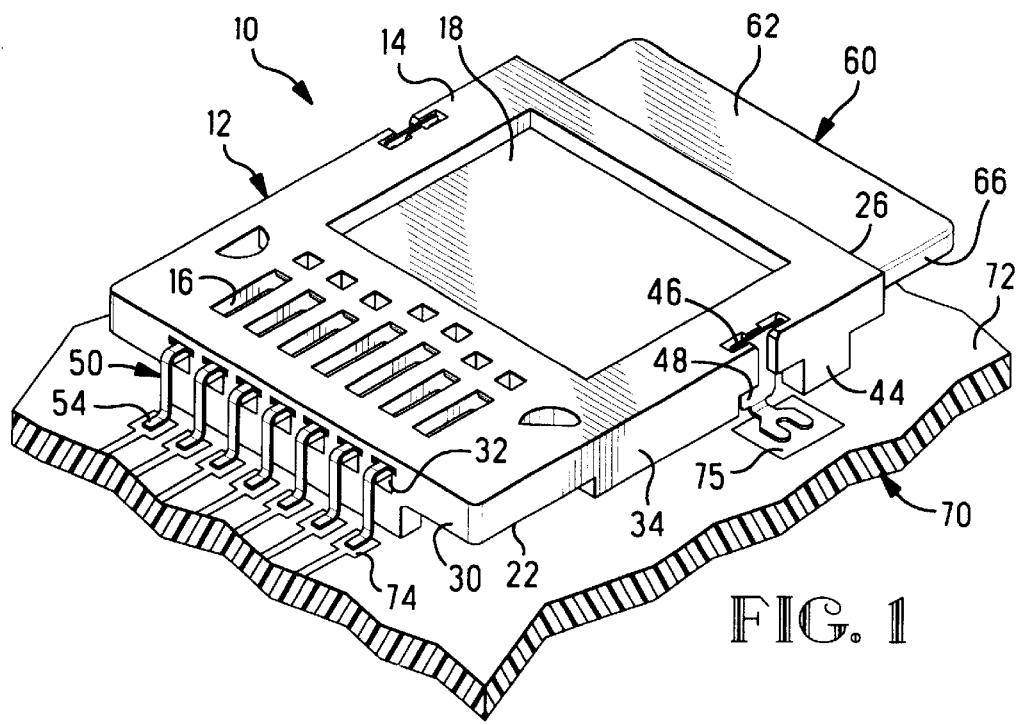
FIG. 1 is an isometric view of the card reader of the present invention mounted to a circuit board and having a card inserted therein.

Referring now to FIGS. 1 through 5, card reader 10 includes a housing 12 having a top wall 14, a bottom or board mounting face 22, a card-receiving face 26, a rear face or wall 30, and opposed side walls 34, together defining a card-receiving slot 40 and an array of terminals 50. Top wall 14 includes a plurality of slots 16 that provide clearance for the terminals 50 when they engage pads 64 the card 60.

Figure 2:
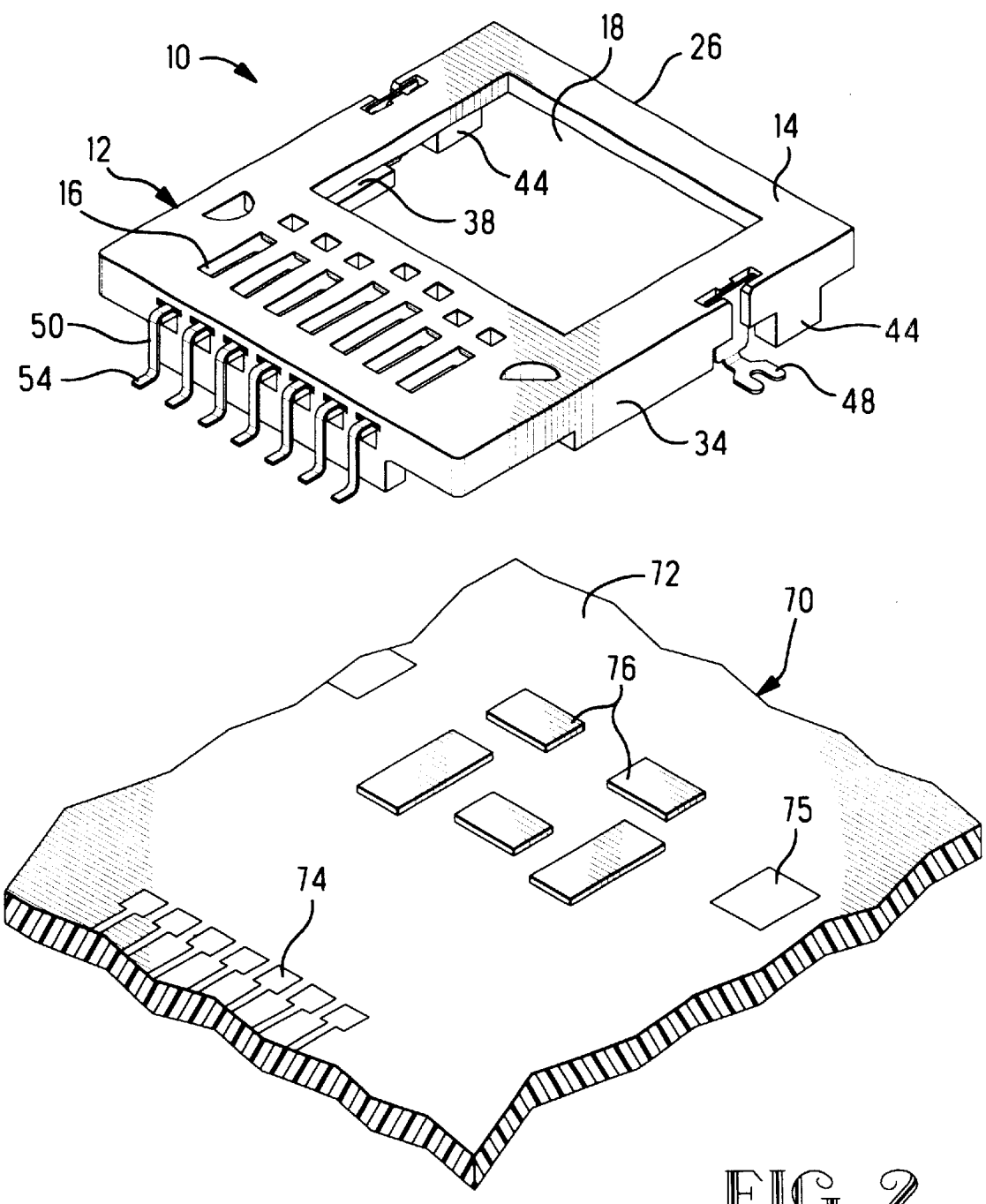
FIG. 2 is an isometric view of the card reader of FIG. 1 exploded from the circuit board and with the card removed and illustrating components mounted to the board beneath the card reader.

An enlarged opening 18 remote from the terminals 50 extends through the top wall 14 and is aligned with a corresponding opening beneath the card-receiving slot 40. When card reader 10 is mounted to a circuit board 70, opening 18 permits access to the surface 72 of the circuit board 70 to permit placement of various components 76 on the board as shown in FIGS. 2 and 4.

Figure 3:
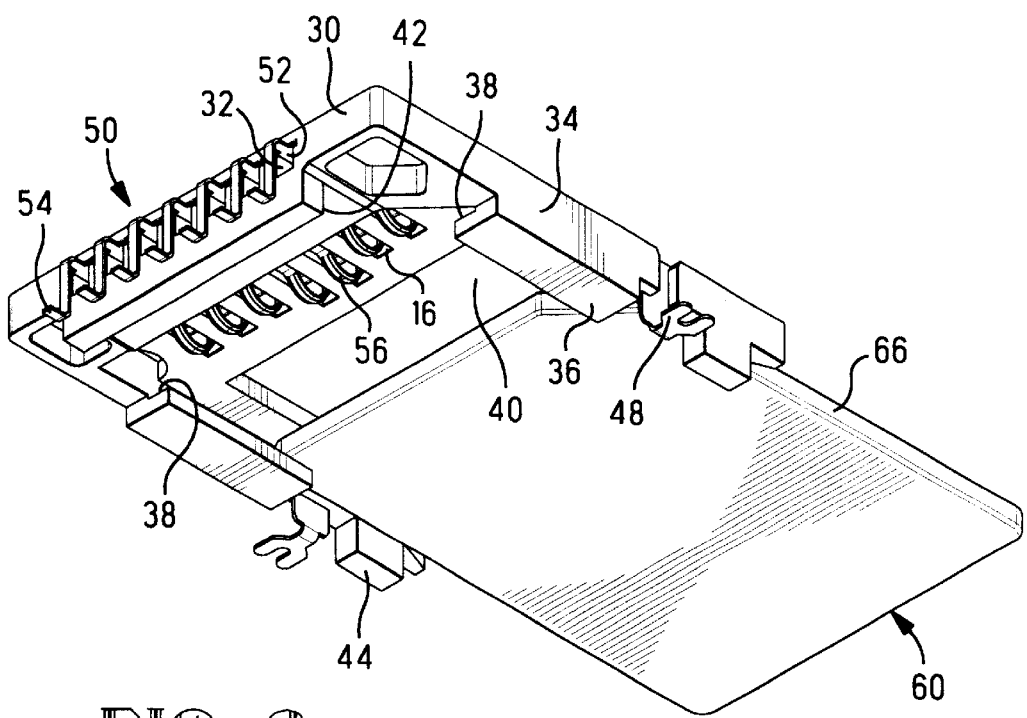
FIG. 3 is an isometric view of the board mounting face of the card reader of FIG. 1 having a card partially inserted therein.

Rear wall 30 includes a plurality of terminal-receiving passageways 32 in which are disposed the terminals 50. Side walls 34 include inwardly directed portions 36 at the lower edges thereof defining card-receiving rails 38 along portions of the side walls 34 dimensioned to receive side edges 66 of a card 60 inserted into the card receiving cavity 40, as shown in FIG. 3. Card-receiving cavity 40 includes an inner end 42 which defines a card stop surface. Side walls 34 further include hold-down receiving slots 46 for receiving hold-downs 48 and stand-off portions 44 proximate card-receiving face 26. As can be seen in FIGS. 1, 4 and 5 the rear wall 30, and stand-off portions 44 are elongated to provide a selected distance between the circuit board surface 72 and the cardreceiving slot 40 such that low profile electronic components 76 may be mounted to the circuit board and not interfere with the operation of the card 60 being inserted or withdrawn from the card reader 10.

Terminals 50 include body portions 52, board connecting sections 54 and card-connecting sections 56 for engaging circuit pads 64 on the surface 62 of card 60. It is to be understood that the board connecting sections 54 may be leads that are received in through-holes of the board or surface mounted as shown herein.

In accordance with the invention, surface 72 of circuit board 70 includes a plurality of contact pads 74 for engaging respective board connecting sections 54 of card reader 10 and a plurality of contact pads (not shown) to which components 76 can be mounted. In assembling the card reader of the present invention, the card reader 10 is first positioned on circuit boards 70 by means of solder paste, or the like (not shown) and the low profile electronic components are then mounted to board 70 through the opening 18. This allows the manufacturer to position the components and the card reader at optimum locations. The board with the components and the card reader thereon can then be soldered by means of infrared, or other techniques as known in the art to cause the solder to flow to electrically and mechanically secure the card reader 10 and the components 76 to the circuit board 70.

It is to be understood the term solder also includes conductive adhesives or other materials used to electrically connect electrical devices to boards. Additionally the electronic components may have leads that are to be secured by solder or the like in through holes of the board by solder reflow techniques. The hold-downs 48 may be soldered to pads 75 or alternatively attached by mechanical means to the board 70.

The present invention provides an advantage of minimizing the size of the circuit board 70 thereby permitting the electronic apparatus, such as a cellular telephone or pager to be made considerably smaller.

It is thought that the card reader of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. A card reader comprising a housing including a top wall, card-receiving slot, and a board-mounting face, said card-receiving slot being spaced upwardly a selected distance from said board-mounting face; and said top wall including an opening therethrough in communication with said card-receiving slot, said opening being aligned with a corresponding opening in said housing beneath said card-receiving slot, whereby portions of a board beneath said housing are exposed for access from above said how housing after mounting to said board, when a card is not disposed in said card-receiving slot, thereafter permitting low profile electronic components to be mounted on said exposed portions of said board or tested or removed therefrom.

2. The card reader of claim 1, wherein the housing includes an array of terminals having board connecting sections exposed along said board-mounting face and card connecting sections exposed in said card receiving slot.

3. The card reader of claim 2, wherein the opening is remote from the card connecting sections and board connecting sections.

4. The card reader of claim 1, wherein the housing has side walls with rails there along to receive side edges of a card.

5. The card reader of claim 1, wherein the housing has stand offs proximate the board mounting face.

* * * * *

UNITED STATES PATENT AND TRADEMARK OFFICE
CERTIFICATE OF CORRECTION

PATENT NO. : 6,293,464 B1  
DATED : September 25, 2001  
INVENTOR(S) : Smalley, Jr.

Page 1 of 1

It is certified that error appears in the above-identified patent and that said Letters Patent is hereby corrected as shown below:

<u>Column 4, claim 1,</u>  
Line 6, remove the word "how" before the word "housing"

Signed and Sealed this

Twenty-sixth Day of March, 2002

Attest:

Attesting Officer

JAMES E. ROGAN  
*Director of the United States Patent and Trademark Office*